United States Patent
Scheffler et al.

(12) 
(10) Patent No.: US 6,299,525 B1
(45) Date of Patent: Oct. 9, 2001

(54) RECONFIGURABLE AIR SUPPLY ARRANGEMENT OF AN AIR-CONDITIONING SYSTEM FOR BELOW-DECK AREAS OF A PASSENGER AIRCRAFT

(75) Inventors: Hans-Joachim Scheffler, Hamburg; Michael Markwart, Halstenbek; Uwe Buchholz, Bliedersdorf, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/645,259

(22) Filed: Aug. 24, 2000

(30) Foreign Application Priority Data

Aug. 25, 1999 (DE) .............................. 199 40 165

(51) Int. Cl.$^7$ .................................................. B64D 13/00
(52) U.S. Cl. ........................................ 454/76; 244/118.5
(58) Field of Search ................ 454/71, 76, 77; 244/118.5

(56) References Cited

U.S. PATENT DOCUMENTS

| | | | |
|---|---|---|---|
| 5,118,053 | * | 6/1992 | Singh et al. ........................ 244/118.5 |
| 5,516,330 | | 5/1996 | Dechow et al. . |
| 5,695,396 | * | 12/1997 | Markwart et al. ....................... 454/76 |
| 5,890,957 | | 4/1999 | Scherer et al. . |

FOREIGN PATENT DOCUMENTS 4335152    4/1995   (DE) .

* cited by examiner

*Primary Examiner*—Harold Joyce
*Assistant Examiner*—Derek Boles
(74) *Attorney, Agent, or Firm*—W. F. Fasse; W. G. Fasse

(57) ABSTRACT

The below-deck space of an aircraft may be selectively configured as a freight hold or alternatively as a passenger sleeping cabin space by arranging a sleeping cabin container therein. An air conditioning system for this below-deck space provides air in a supply air main line (31), which branches off to at least one supply air delivery line (19). A first flange (23) is provided at the end of the supply air delivery line (19), and a seal collar (25) seals the end relative to the freight hold wall (29). When a sleeping cabin container is to be arranged in the below-deck space, a flap door (24) is pivoted into an open position, and the flange (28) at the end of a ventilation duct (27) of the sleeping cabin is connected directly to the flange (23). When the sleeping cabin container is removed from the freight hold, the flap door (24) is pivoted into a closed position, in which it covers the mouth opening of the flange (23), and allows an air flow into the freight hold only through the smaller restricted cross-section of an air throughflow opening (26) in the flap door (24). The air supply arrangement can be easily adjusted to meet the different air flow requirements of the sleeping cabin configuration and the freight hold configuration without requiring any recalibration of the air-conditioning system itself.

17 Claims, 1 Drawing Sheet

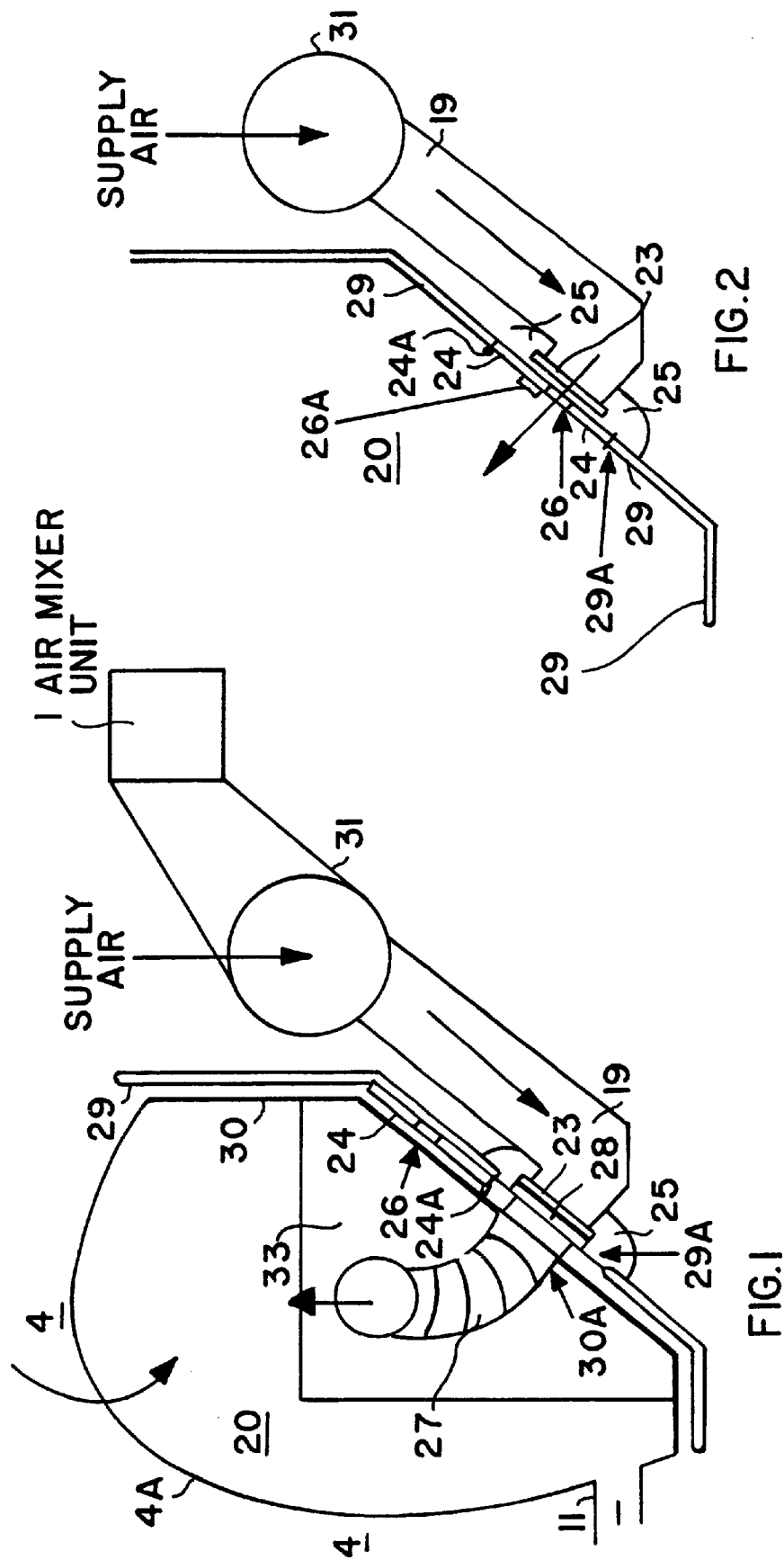

RECONFIGURABLE AIR SUPPLY ARRANGEMENT OF AN AIR-CONDITIONING SYSTEM FOR BELOW-DECK AREAS OF A PASSENGER AIRCRAFT

CROSS-REFERENCE TO RELATED APPLICATION

This application is related to our copending U.S. application entitled "AIR-CONDITIONING SYSTEM FOR BELOW-DECK AREAS OF A PASSENGER AIRCRAFT", filed on Jun. 16, 2000.

FIELD OF THE INVENTION

The invention relates to an arrangement or system for air-conditioning the underfloor or below-deck areas of a passenger aircraft, and particularly the freight compartment and/or other utilized areas under the main deck floor of a passenger aircraft, while making rational and economic use of the available heat energy resources of the passenger aircraft. The invention further relates to such an arrangement that provides prophylactic measures of fire protection. Particularly, the invention relates to a reconfigurable air supply or air inlet arrangement for supplying air into the below-deck areas of a passenger aircraft.

BACKGROUND INFORMATION

It is generally known in the art that various underfloor or below-deck areas of certain types of passenger aircraft can be used by passengers or crew members during at least portions of a flight. For example, it is known to outfit sleeping compartment containers within the freight or cargo hold of an aircraft, such that these sleeping compartment containers provide sleeping areas for individual passengers.

Various arrangements are also known for air-conditioning the several fuselage spaces including the freight or cargo compartment spaces of known aircraft types. In order to air-condition the above mentioned sleeping compartment containers to be suitable for occupancy by individual passengers, the conditioned air that is blown into these sleeping containers is heated to the required room temperature by an electrical heater, or alternatively cooled to the required temperature by a suitable cooling arrangement. The blown-in supply air is made up of various air components, which include portions of recycled air that has been withdrawn or extracted out of the passenger area, recycled i.e. prepared for reuse, and then recirculated, while additionally being cooled to a predetermined temperature using suitable cooling devices, for example an aircraft skin heat exchanger that uses the very low ambient environmental temperature prevailing outside of an aircraft flying at a typical cruise altitude. In this context, only temperature reductions within a rather strictly limited temperature range can be carried out during such a cooling process. While the energy requirements for operating the aircraft air-conditioning packs are necessarily provided in any event, the above described known system of preparing and supplying air into the below-deck spaces requires at least an increased provision of electrical energy for operating the heaters that are needed for raising the temperature of the supplied air to higher levels. Also, the load on the existing air-conditioning packs is increased. As a result, the total energy consumption is increased, and makes greater demands on the limited on-board energy resources of the aircraft, which in turn also increases the costs of operating the aircraft.

A general reference disclosing means for carrying out the airconditioning of cabin spaces of a passenger aircraft is German Patent Publication 43 35 152 C1 and corresponding U.S. Pat. No. 5,516,330 (Dechow et al.), which also suggest measures for airconditioning the underfloor or below-deck spaces of the aircraft, such as the electrotechnical and electronics areas and the freight compartment areas. The disclosed ventilation or recirculation system relates primarily to the air-conditioning and ventilation of the passenger and cockpit areas of the aircraft, while the underfloor area of the aircraft is connected to the same system.

A person of ordinary skill in the art of aircraft construction will recognize from the above mentioned publications, that an air mixer unit provides prepared mixed air to the passenger and cockpit areas of a passenger aircraft. In this context, the mixed air is made up of partial quantities of fresh air and of recycled used exhaust air. The recycled air comprises used air that is exhausted out of the passenger and cockpit areas and thereafter prepared for recirculation in a so-called cabin recycling unit, comprising a particle and/or odor filter unit, a blower unit, a carbon dioxide absorber unit, and a heat exchanger unit. The resulting recycled or recirculation air is delivered to the mixer unit together with externally tapped fresh air, which is extracted as hot bleed air from the engines of the aircraft for example. The prepared recycled air and the hot bleed air are mixed in the mixer unit, and then the resulting mixed air is blown from the mixer unit into the passenger and cockpit spaces.

In the above context, the heat exchanger unit integrated into the recycling unit receives externally extracted cool exterior air, by means of which the recirculated exhaust air is cooled to a suitable or comfortable tempered temperature level before it leaves the recycling unit to be provided as so-called prepared recirculation air to the mixer unit. It is also suggested, that mixed air is additionally post-tempered by admixing a further regulated or branched-off partial quantity of bleed air that is tapped from the engines, before the resulting tempered mixed air is introduced into the air-conditioned spaces, namely the passenger and cockpit spaces. The introduction of this post-tempering bleed air is controlled through a so-called trimming air control valve unit. This unit, which comprises two trimming air regulation valves, separately regulates the supply of the above-mentioned trimming air, on the one hand for the passenger space, and on the other hand for the cockpit.

The underfloor spaces or areas of the aircraft located below the main deck are only indirectly affected by the disclosed system, because it is merely suggested that the ventilation of the above-mentioned electrotechnical and/or electronics spaces and the freight compartment spaces is to be achieved by the leakage of conditioned air escaping from the cockpit space into the just mentioned underfloor spaces through leakage openings. In other words, the fresh air, or generally the supplied air, reaches the electrotechnical and electronics spaces as well as the freight compartment spaces only indirectly by penetrating through leakage openings. The air then leaves the freight compartment or cargo hold space either through an exhaust valve or through a fuselage leak, so as to penetrate out of the pressurized fuselage to the ambient exterior environment. This contemplated arrangement primarily relates to the compensation of leaks in the pressurized fuselage, even though it further aims to maintain the air quality in the aircraft cabin by supplying fresh air. Thereby, the supply of fresh air is only necessary for replacing the quantity of air that escapes the fuselage through fuselage leaks. The above-mentioned prior art reference does not suggest appropriate measures for the improved air-conditioning of underfloor areas of an aircraft while making rational and economic use of the available energy resources. The prior art reference also provides no suggestion toward prophylactic fire protection measures.

Different air-conditioning and ventilating requirements pertain when the below-deck space is outfitted with sleeping cabin containers or the like, in comparison to the situation when the below-deck space is used as a freight hold or cargo compartment. Namely, a greater volume flow rate of air is typically needed for air-conditioning and ventilation when the below-deck space is outfitted to be occupied by people, in comparison to the case when the below-deck space is to be used only as a freight hold or cargo compartment. It is also possible to use a portion of the below-deck space as a freight hold or cargo compartment while simultaneously using another portion of the below-deck space as a passenger or crew area outfitted with sleeping cabin containers or the like. In such a case, each portion of the below-deck space has different air-conditioning and ventilating requirements. Since a given aircraft can be readily reconfigured to be or not to be outfitted with sleeping cabin containers depending on the particular flight requirements, it is also necessary to achieve a rapid and easy reconfiguration of the air-conditioning system and particularly the air supply or air inlet arrangements that supply the air-conditioning air into the below-deck space. The prior art has not provided any means for achieving such a rapid reconfiguration of the air-conditioning system, but instead would require a re-building or reassembly of different components of the system as well as a recalibration to provide the respective appropriate air flow quantities for the two different configurations or uses of the below-deck space.

SUMMARY OF THE INVENTION

In view of the above, it is an object of our above-mentioned cross-referenced related application to provide an arrangement for air-conditioning the underfloor or below-deck areas of a passenger aircraft, which may relate to the freight or cargo hold of an aircraft with or without sleeping compartment containers arranged therein. More particularly, it is an object of our above-mentioned cross-referenced related application to provide a system for air-conditioning and ventilating such below-deck spaces with metered quantities of supply air being provided and exhaust air being removed in a rational and economic manner, while utilizing the available energy resources of the aircraft, and while providing prophylactic measures of fire protection in such below-deck areas in order to prevent the area spreading of a fire to the extent possible, and at least to ensure that the exhaust air from the freight hold including the sleeping compartment containers, which air has been polluted by smoke or other toxic substances generated by the fire, is not exhausted out of these spaces and then recirculated to other air-conditioned spaces.

The entire disclosure of the above-mentioned related application is incorporated herein by reference, and the details thereof will not be repeated herein. Rather, a familiarity with the disclosure of the related application is assumed, as a basis for an understanding of the further disclosure of the additional features according to the present invention.

In view of the above, it is an object of the present invention, which is a further development of the above-mentioned related application, to provide a reconfigurable air supply or air inlet arrangement that can be rationally and efficiently used in combination with an air-conditioning system for below-deck areas of a passenger aircraft according to the above-mentioned related application, or in combination with other air-conditioning systems. Particularly, the air supply arrangement according to the present invention is to enable an effective, efficient, and relatively simple reconfiguration of the air supply arrangement when changing the configuration of the below-deck space from a freight hold configuration to a passenger compartment configuration and vice versa, so as to provide respectively proper ventilation and air-conditioning for the below-deck space in both of the above configurations. The invention thus aims to ensure a flexibility of the utilization of the below-deck space while achieving the required degree of passenger comfort on the one hand, or the required degree of ventilation in freight hold spaces, while simultaneously providing the required degree of fire protection, without requiring a complicated recalibration of the air supply system for the two different utilizations or configurations of the below-deck space. The invention further aims to avoid or overcome the disadvantages of the prior art and to achieve additional advantages, as are apparent from the present specification.

The above objects have been achieved according to the present invention in an air supply arrangement for an air-conditioning system for below-deck areas of a passenger aircraft. According to the invention, the air-conditioning system includes an air mixer unit that provides a mixed air flow of fresh air as well as recycled air, a supply air main line connected to the air mixer unit to supply the mixed air flow, at least one supply air delivery line or branch line that separately branches off from the supply air main line and leads to a below-deck space of the passenger aircraft, as well as an exhaust air main line that leads away from the below deck space to remove exhaust air from the below-deck space and ultimately dump the exhaust air overboard to the outside environment surround the aircraft. The end of the supply air delivery line connected to the below-deck space has a first flange provided thereon, and a pivotable flap is pivotably connected to the flange, preferably at an edge or end face thereof, by a suitable hinge member.

The flap is configured and adapted to cover the open flow cross-section of the supply air delivery line or at least the first flange provided on the end thereof. However, the flap has at least one air throughflow opening therein, whereby this opening has a defined cross-sectional area that is preferably smaller than the open flow cross-section of the supply air delivery line or the first flange on the end thereof, and particularly smaller than the inner diameter of the supply air delivery line.

The flap can be positioned in an open position in which it does not cover or obstruct the flow cross-section of the supply air delivery line and particularly the first flange provided at the end thereof. Alternatively, the flap can be positioned in a closed position by pivoting the flap about the hinge member, so that the flap covers and substantially closes the flow cross-section of the supply air delivery line and particularly of the first flange provided at the end of the supply air delivery line. In the closed position, the flap acts as a throttle flap and allows an air flow only through the smaller air throughflow opening provided in the flap.

In this manner, the air supply arrangement may be easily reconfigured to provide an increased air flow when the flap is in the open position, or to provide a defined reduced air flow when the flap is in the closed position. This allows the air supply arrangement to be used and easily reconfigured as needed in connection with different configurations or outfittings of the below-deck space. Namely, when the below-deck space is outfitted with passenger sleeping cabin containers or the like, a greater air flow for ventilation or air-condition is required, so the flap is positioned in the open position. On the other hand, when the below-deck space is not outfitted with passenger sleeping cabin containers or the like, but instead is simply used as a freight or cargo hold, then a reduced air flow is needed, so the flap is simply positioned in the closed position. Since the air throughflow opening has a pre-defined reduced cross-section, it provides a predefined rated air flow when the flap is in the closed position, so that the system does not need to be recalibrated in any manner beyond simply closing the flap from the open position to the closed position when the below-deck space is to be reconfigured from passenger or crew use to freight or cargo storage.

In a preferred embodiment, a ventilation duct is provided in a respective passenger sleeping cabin container that is installed in the below-deck space. An end of the ventilation duct is provided with a second flange, which can be coupled with the first flange on the end of the supply air delivery line when the flap is in the open position, to provide the full air flow of the supply air delivery line into the ventilation duct. This ventilation duct then distributes the air flow to the required locations in the sleeping cabin container.

BRIEF DESCRIPTION OF THE DRAWINGS

In order that the invention may be clearly understood, it will now be described in connection with example an embodiment, with reference to the accompanying drawings, wherein:

FIG. 1 is a schematic sectional view of an air supply arrangement according to the invention, for air-conditioning a sleeping cabin container installed in a below-deck space; and FIG. 2 is a view similar to that of FIG. 1, but showing the arrangement reconfigured for use with a freight hold without a sleeping cabin container installed in the below-deck space.

DETAILED DESCRIPTION OF PREFERRED EXAMPLE EMBODIMENTS AND OF THE BEST MODE OF THE INVENTION

FIG. 1 schematically represents the structure of the present air supply arrangement for an air-conditioning system, for a below-deck space of a passenger aircraft, and particularly such a below-deck space 4 which is generally a freight or cargo hold 4, but has a sleeping cabin container 4A installed thereon. The term "below-deck space" herein generally covers both such a space used as a cargo or freight hold and such a space used as a passenger compartment (for example within an installed sleeping cabin container). As is generally known, such a sleeping cabin container 4A has the outer dimensions and configuration of a standard freight container to fit into the standard freight hold of the aircraft, but is internally outfitted with a bed and the like for use by passengers or crew members, especially during a long overnight flight. The sleeping cabin container 4A includes a trim panel wall 30 that encloses the sleeping cabin container space 20 therein, as well as a trim component 33 that may form a rectangular bench or shelf over the sloping wall at the lower edge or corner of the sleeping cabin container 4A. For example, a seating bench or a sleeping bed may be arranged on top of the bench-like trim component 33, but primarily, the trim component 33 covers or encloses a ventilation duct 27 arranged therein so as to protect the duct 27 from damage and to visually hide the duct 27. The function and arrangement of the duct 27 will be discussed further below. The sleeping cabin compartment 4A is arranged so that the wall 30 thereof is spaced a small distance (e.g. from 2 to 15 cm) away from and extends along a freight hold wall 30 that bounds the below-deck space or freight hold. Thus, the trim panel wall 30 of the sleeping cabin container 4A is arranged close and generally parallel to the freight hold wall 29, whereby it follows the sloping configuration of the freight hold wall 29 near the bottom edge of the sleeping cabin container 4A, at the area where the curving contour of the aircraft fuselage would not accommodate a full rectangular corner or edge of the container. That is where the trim component 33 is arranged. Also in this area, a first opening 29A in the wall 29 is generally aligned with a second opening 30A in the wall 30.

The inventive arrangement as shown in FIG. 1 serves to ventilate and air-condition the below-deck space 4, i.e. the sleeping cabin container space 20. For this purpose, properly tempered and prepared mixed air is formed by mixing fresh air and recycled air in an air mixer unit 1, from where this mixed supply air is supplied through a supply air main line 31 to one or more supply air delivery lines or branch lines 19 connected to the main line 31. The air-conditioning system for supplying the air may be in accordance with the above mentioned related application, or any known air-conditioning system. The one or more supply air delivery lines or branch lines 19 individually supply the prepared air to proper locations through respective interfaces into the below-deck space 4, and particularly into the sleeping cabin container space 20 in the situation illustrated in FIG. 1.

In order to provide the air from the supply air delivery line 19 into the sleeping cabin container space 20, the first and second openings 29A and 30A of the freight hold wall 29 and the trim panel wall 30 of the sleeping cabin container are in mutually aligned positions. The ventilation duct 27, which is preferably embodied as a flexible duct or air hose, extends through the aligned openings 29A and 30A of the freight hold wall 29 and the trim panel wall 30 and extends into the sleeping cabin container space 20. The respectively adjacent ends of the air supply delivery line 19 and of the ventilation duct 27 are respectively equipped with a first flange 23 and a second flange 28 that are respectively configured and adapted to be connected to each other (for example the two flanges respectively have mating V-section shapes), directly adjacent to the freight hold wall 29 and outside of the sleeping cabin container space 20. The above described trim component 33 serves to visually hide and protect the ventilation duct 27, especially to prevent unintentional damage thereto, while also providing a space within which the duct 27 may extend to distribute the supplied air to different locations within the sleeping cabin container space 20 through appropriate air inlets. Used exhaust air is removed from the space 20 through an exhaust air duct 11 in any suitable manner.

When the sleeping cabin container 4A is being installed in the below-deck space 4, the flap 24 discussed below is positioned in the open position and then it is a simple matter to connect the flanges 23 and 28 to each other in order to establish the air supply from the aircraft-side supply air delivery line 19 to the container-side ventilation duct 27 and thereby into the sleeping cabin container space 20. A seal element 25 embodied as a seal no collar or muff 25 seals the area of the connection between the two flanges 23 and 28 and also particularly seals the air conduit passing through the opening 29A provided in the freight hold wall 29, to prevent undesired air leakage therethrough. Moreover, this seal collar 25 protects the flanges 23 and 28.

The freight hold wall 29 and the trim panel wall 30 of the sleeping cabin container 4A are arranged spaced apart from one another a certain spacing distance as mentioned above, and are secured to each other in such relative positions. The pivotably movable flap 24 is located in the hollow interspace between the two walls 29 and 30, especially so that this flap 24 lies along the inner surface of the freight hold wall 29, when the flap 24 is in its open position. The flap 24 is pivotably supported by a pivot hinge member 24A, which may comprise a so-called piano-hinge, or an individual hinge with a hinge pin, or a plurality of such individual hinges, or an integral flexible hinge joint of plastic or fiber-reinforced composite material, or any other known type of hinge member. The other side of the hinge member 24A is preferably secured to the side edge or the rim of the first flange 23 provided on the end of the supply air delivery line 19. Alternatively, the hinge member 24A could be secured to the freight hold wall 29, which in turn is connected or secured to the first flange 23, so that at least indirectly, the hinge member 24A is connected to the first flange 23 via the freight hold wall 29. In the preferred embodiment, the hinge member 24A is directly secured to the first flange 23.

The flap 24 has an outer dimension and configuration adapted to cover the mouth opening, i.e. the open flow cross-section, of the first flange 23, when the flap 24 is pivoted downwardly into a closed position as shown in FIG. 2, which will be discussed further below. In that position, it is also significant that the flap 24 further has at least one air throughflow opening 26 therein, with a defined diameter or flow cross-section, as will be discussed further below. However, in the open position as shown in FIG. 1, the flap 24 does not influence the air flow from the supply air delivery line 19 through the connected flanges 23 and 28, into the ventilation duct 27, and from there into the sleeping cabin container space 20. The flap 24 does not need to be fixed in this open position, because it will remain in this position simply by the force of gravity, i.e. the open position is an equilibrium position. Alternatively, a mechanical or magnetic catch or the like may be provided to positively hold the flap 24 in the open position.

Now turning to FIG. 2, the above-described arrangement is shown in an alternative configuration, wherein the sleeping cabin container 4A has been removed from the below-deck space 4, and the below-deck space 4 is to be used as a freight hold or cargo compartment to receive standard freight containers, or baggage, or the like therein. It should also be understood that the configuration of FIG. 1 could apply to a portion of the below-deck space in an aircraft, while the configuration of FIG. 2 applies to a different portion of the below-deck space of that same aircraft. In order to remove the sleeping cabin container 4A, the ventilation duct 27 is first removed or decoupled from the supply air delivery line 19 by releasing the V-flange connection provided by the flanges 23 and 28. Thereafter, the flap 24 is simply pivoted downward into the closed position about the hinge member 24A, without moving or adjusting the supply air delivery line 19, so that the flap 24 covers the open mouth of the flange 23. In this closed position, the flap 24 is preferably set into the corresponding opening 29A in the freight hold wall 29, whereby the inner contour of the flap 24 is substantially flush and conforming with the inner contour of the wall 29. The end of the supply air delivery line 19 remains held and secured relative to the wall 29 by the flange 23 and the seal collar 25.

In any event, in the configuration of FIG. 2, the flap 24 has been pivoted downwardly into the closed position, where the flap acts as a throttle flap. The repositioning of the flap 24 from the open position into the closed position can be carried out manually quite easily by the workers who remove the sleeping cabin container 4A and prepare the below-deck space 4 for use as a freight hold or cargo compartment. When it is in the closed position, the flap 24 covers and thereby substantially closes the open flow cross-section of the mouth of the first flange 23, and thereby constrains the air flow to the much smaller cross-sectional area of the air throughflow opening 26 provided in the flap 24. The diameter of the air throughflow opening 26 is smaller than the inner diameter of the supply air delivery line 19. For example, in a practical case the ratio of these two diameters is about 1:4, i.e. one to four. In other words, the flow cross-sectional area of the air throughflow opening 26 may especially be about 1/16 of the open flow cross-section of the first flange 23 and the interior of the supply air delivery line 19. More generally, this relationship between the two cross-sectional areas may be in the range from 4% to 20%. These relative limitations on the cross-sectional areas and the stated range thereof provide proper relative proportions of the air flow rate when the flap is closed in comparison to when the flap is open, for typical air-conditioning and ventilation requirements of a passenger aircraft with a dual-use reconfigurable below-deck space. The exact or particular cross-sectional area of the air throughflow opening 26 is predetermined by the ventilation and air-conditioning requirements of the below deck space 4 when it is used in the freight hold or cargo compartment configuration, as well as the operating parameters of the respective air-conditioning system.

The increased flow resistance and thus the reduced air flow rate provided through the air throughflow opening 26 directly and automatically adjusts the air delivery rate that will be provided into the below deck space 4 to meet the ventilation and air-conditioning requirements at hand for using the below-deck space 4 as a freight hold. It is not necessary to carry out any adjustment or recalibration of the air-conditioning system itself, e.g. it is not necessary to adjust the blower or the ducts or other components of the air-conditioning system itself, as is typically the case in prior art air-conditioning systems when a reconfiguration as described above is to be carried out.

In a further alternative embodiment, a slide gate 26A may be positioned on the flap 24, to allow an easy mechanical adjustment of the cross-sectional area of the air throughflow opening 26. For example, this slide gate 26A may be positioned in either of two positions in which a larger or a smaller cross-sectional opening of the air throughflow opening 26 is provided, by linearly or pivotally sliding the slide gate. In this manner, it is simple to provide a further adjustability of the air flow rate, without requiring any adjustments or calibration of the air-conditioning system itself. The workers simply need to close the flaps 24 and then slide the slide gates 26A into either of the two positions, depending on the particular utilization of the below-deck space 4, for example as a freight hold of containerized freight, or as a baggage compartment, or for an animal carrier compartment, or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger aircraft including a fuselage, a deck floor in said fuselage, a passenger cabin above said deck floor, a below-deck space below said deck floor, a below-deck wall inside said fuselage and bounding said below-deck space, a source of fresh air, a source of recycled air, an air mixer unit that is connected to said source of fresh air and to said source of recycled air and that is adapted to receive and mix fresh air and recycled air to prepare mixed air, and a supply air main line that is connected to said air mixer unit and that is adapted to convey said mixed air therein, an air-conditioning arrangement for adaptably air-conditioning said below-deck space, said air-conditioning arrangement comprising:

a supply air delivery line that is connected to said supply air main line and that is adapted to convey said mixed air therein from said supply air main line to said below-deck space, wherein said supply air delivery line has is an end arranged proximate to a first opening provided in said below-deck wall;

a first flange provided on said end of said supply air delivery line;

a pivotable flap having at least one air throughflow opening therein, wherein said air throughflow opening has a defined flow cross-sectional area; and pivot hinge member that is connected to said flap and that pivotably connects said flap to said first flange.

2. The air-conditioning arrangement in the passenger aircraft according to claim 1, wherein said pivot hinge member is connected directly to said first flange and to said flap.

3. The air-conditioning arrangement in the passenger aircraft according to claim 1, wherein said pivot hinge member is connected directly to said flap and said below-deck wall and indirectly to said first flange via said below-deck wall.

4. The air-conditioning arrangement in the passenger aircraft according to claim 1, wherein said first flange is connected to said below-deck wall around said first opening.

5. The air-conditioning arrangement in the passenger aircraft according to claim 1, further comprising a seal collar arranged and providing a seal around said first flange, said end of said supply air delivery line, and said first opening.

6. The air-conditioning arrangement in the passenger aircraft according to claim 1, wherein said flap is configured and dimensioned so as to fit into and close said first opening in said below-deck wall without air leakage between said flap and said below-deck wall.

7. The air-conditioning arrangement in the passenger aircraft according to claim 1, wherein said flap is adapted to be pivoted selectively to an open position and to a closed position, when said flap is in said open position said flap extends along and adjacent to an inner wall surface of said below-deck wall facing said below-deck space, and when said flap is in said closed position said flap is received in said first opening and an inner flap surface of said flap facing said below-deck space is continuous and flush with said inner wall surface and has a contour matching said inner wall surface.

8. The air-conditioning arrangement in the passenger aircraft according to claim 1, further comprising a slide gate slidingly arranged on said flap and adapted to selectively cover at least a portion of said air throughflow opening.

9. The air-conditioning arrangement in the passenger aircraft according to claim 1, wherein a supply air maximum flow cross-sectional area is defined by the lesser of an inner open cross-section of said first flange and an inner open cross-section of said supply air delivery line, and wherein said defined flow cross-sectional area of said air throughflow opening is less than said supply air maximum flow cross-sectional area.

10. The air-conditioning arrangement in the passenger aircraft according to claim 9, wherein said defined flow cross-sectional area is in a range from 4% to 20% of said supply air maximum flow cross-sectional area.

11. The air-conditioning arrangement in the passenger aircraft according to claim 9, wherein said defined flow cross-sectional area is one sixteenth of said supply air maximum flow cross-sectional area.

12. The air-conditioning arrangement in the passenger aircraft according to claim 1, wherein said flap is adapted to be pivoted into a closed position in which said flap covers an open mouth of said first flange and acts as a throttle flap, whereby an air flow of said mixed air is confined from an open cross-sectional area of said open mouth of said first flange to said defined flow cross-sectional area of said air throughflow opening.

13. The air-conditioning arrangement in the passenger aircraft according to claim 1, wherein said flap is adapted to be pivoted selectively to an open position in which said flap does not obstruct a flow of said mixed air from said end of said supply air delivery line and to a closed position in which said flap obstructs a flow of said mixed air from said end of said supply air delivery line by constraining said flow of said mixed air to flow only through said air throughflow opening.

14. The air-conditioning arrangement in the passenger aircraft according to claim 13, wherein said flap is adapted to be in said closed position when said below-deck space is a freight hold or cargo compartment and said aircraft does not include a passenger cabin container installed in said below-deck space adjacent to said first opening.

15. The air-conditioning arrangement in the passenger aircraft according to claim 13, wherein said aircraft further includes a sleeping cabin container installed in said below-deck space with a container wall of said container arranged adjacently along and spaced away from said below-deck wall;

wherein said air-conditioning arrangement further comprises a ventilation duct that is provided in said sleeping cabin container and that extends with an end of said ventilation duct out of said sleeping cabin container through a second opening provided in said container wall adjacent to and aligned with said first opening in said below-deck wall, and a second flange provided on said end of said ventilation duct;

wherein said flap is positioned in said open position when said sleeping cabin container is installed in said below deck space; and wherein said second flange is coupled to said first flange.

16. The air-conditioning arrangement in the passenger aircraft according to claim 15, wherein said flap in said open position is received in a space between said container wall and said below-deck wall.

17. The air-conditioning arrangement in the passenger aircraft according to claim 15, wherein said first and second flanges respectively have mating V-sectional shapes.

* * * * *